May 13, 1924.  S. S. JERWAN  1,494,246
DRINK MIXER
Filed May 19, 1923  2 Sheets-Sheet 1

WITNESSES
Frederick Diehl
E. W. Savage

INVENTOR
Shakir S. Jerwan
BY Munn & Co.
ATTORNEYS

May 13, 1924.

S. S. JERWAN

DRINK MIXER

Filed May 19, 1923

WITNESSES
Frederick Diehl.
E. W. Savage

INVENTOR
Shakir S. Jerwan
BY Munn & Co.
ATTORNEYS

Patented May 13, 1924.

1,494,246

UNITED STATES PATENT OFFICE.

SHAKIR S. JERWAN, OF NEW YORK, N. Y.

DRINK MIXER.

Application filed May 19, 1923. Serial No. 640,140.

*To all whom it may concern:*

Be it known that I, SHAKIR S. JERWAN, a citizen of the United States, and a resident of the city of New York, borough of Manhattan, in the county and State of New York, have invented new and useful Improvements in Drink Mixers, of which the following is a full, clear, and exact description.

This invention relates to drink mixers primarily designed for use in preparing drinks sold over soda water fountain counters.

The general object of the invention is the provision of a simple and efficient device for giving drink containers a motion capable of thoroughly mixing the ingredients of any drink that may be contained therein.

A further object of the invention is the provision of a drink container having an oscillatory arm for giving a drink container a drink-mixing motion provided with means for stopping the oscillatory arm in a predetermined position.

These objects are accomplished by pivotally mounting on a frame an arm equipped with a drink container holder, associating with the pivotally mounted arm means for giving it an angular movement about its pivot point so as to move the drink container holder back and forth along an arc of a circle, and providing in conjunction with the operating mechanism means for stopping the pivotally mounted arm in a predetermined position.

These and other objects of the invention will be more clearly understood from the following detailed description and accompanying drawings.

Figure 1:
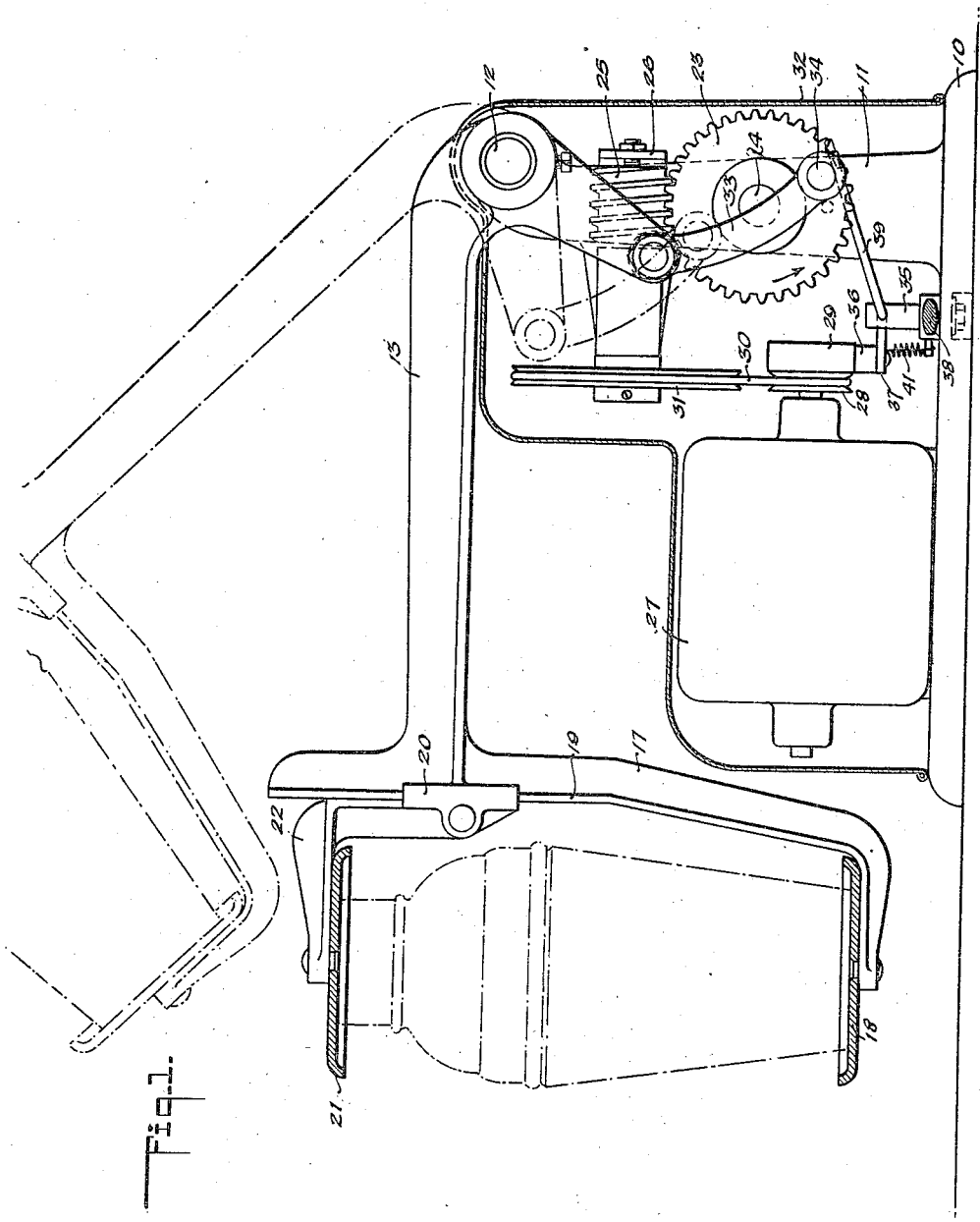
Figure 1 is a side elevation of the drink mixer with a portion of the casing cut away to show its construction.

Referring to the above-mentioned drawings, the invention includes a base 10 having a standard 11 formed integral therewith. Fixed to the standard 11 near its upper end is an axle 12 on which a bell crank 13 is pivotally mounted. The angular spacing of the arms of the bell crank is slightly less than 90°. Fixed to the outer end of the shaft 12 by means of a set screw 16 is a collar 15. Interposed between this collar 15 and the bell crank 13 is a coil spring 14 provided with outturned ends which project into openings provided in the collar 15 and the bell crank 13. The tension on the spring 14 may be varied by adjusting the collar 15.

Formed on the outer end of one arm of the bell crank 13 is a depending L-shaped arm 17, on the front side of which a guide 19 is provided. Carried by the lower portion of the L-shaped arm is a dish-shaped member 18 for receiving any drink container. Movably mounted on the guide 19 is a slide 20 provided with means for clamping it in any desired position on the guide. A second L-shaped arm 22 is carried by the slide 20 and has attached thereto a second dish-shaped member 21 located in alinement with the dish-shaped member 18. This dish-shaped member 21 serves to grip any drink container placed in position on the member 18 so as to firmly fix it in position.

The operating mechanism for giving the arm 14 the necessary angular motion includes a worm gear 23 rotatably mounted on an axle 24 carried by the standard 11. Meshing with the worm gear 23 is a worm 25 supported in brackets 26 attached to the standard 11. Fixed to a common shaft with the worm 25 is a pulley 31. This pulley 31 is driven from a prime mover 27 through a pulley 28 fixed to the shaft of the prime mover and a belt 30. The motion transmitted to the worm gear 23 from the prime mover 27 is conveyed to the bell crank 13 through a rigid link 33, connected to a crank pin 34 provided on the worm gear 23 at a distance from the center.

Figure 3:
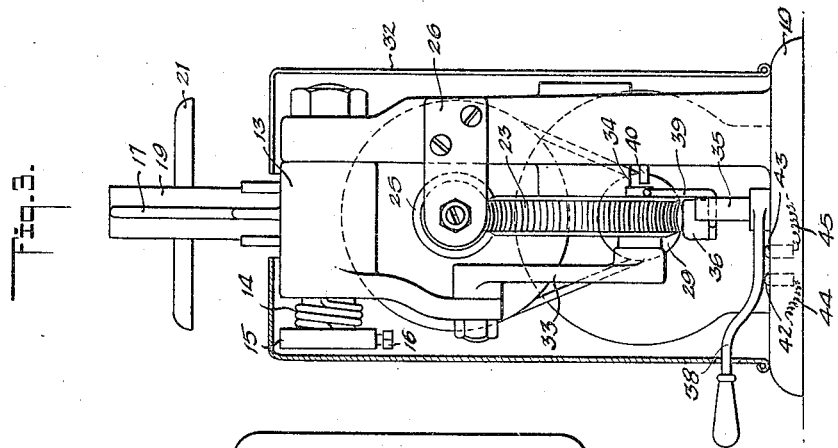
Figure 3 is a rear plan view of the drink mixer with a portion of the casing cut away to show its construction.
Figure 2:
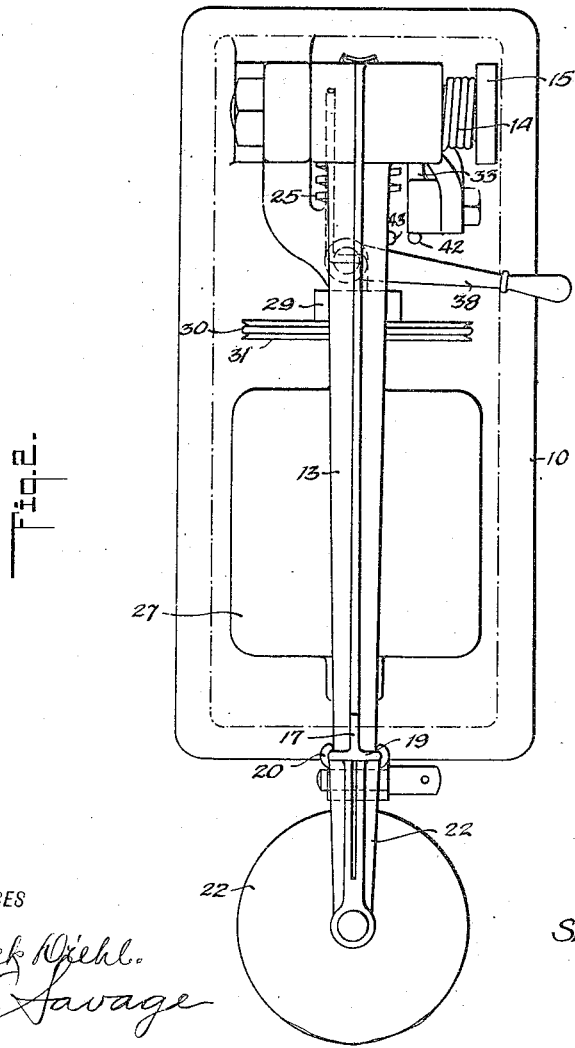
Figure 2 is a top plan view of a drink mixer with the casing removed.

Rotatably mounted in the base 10 is a post 35 operated by means of an arm 38. A lever having an offset therein is carried by the post 35, the offset being rotatably positioned in an opening in the post. This lever presents an arm 37 on one side of the post and an arm 39 on the other. Mounted on the arm 37 is a brake block 36 which cooperates with a drum 29 fixed to the pulley 28 for stopping the prime mover 27. This brake block 36 is normally retained out of engagement with the drum 29 by a spring 41 which is connected between the arm 37 and a pin fixed to the operating arm 38. The arm 39 extends between the standard 11 and the worm gear 23, as shown in Figure 3. Normally the arm 39 is retained in an inactive position by a pin 40 fixed to the standard 11. By rotating the post 35 the arm 39 is moved into the position shown in Figure 3 where it lies in the path of movement of an extension of the crank pin 34. The rotation of the post also carries the brake block 36 into alinement with the drum 29. Consequently when the arm 39 is forced downward by the crank pin 34 the brake block 36 is forced into engagement with the drum 29, stopping the prime mover 27. The crank pin 34 is so positioned on the worm gear 23 that it operates the braking mechanism to stop the prime mover 27 when the arm of the bell crank 13 carrying the drink container receiver reaches a horizontal position, as shown in Figure 1. The operating mechanism of the prime mover of the drink mixer is enclosed by a casing 32.

Referring to Figure 3, two electrical contact members 42 and 43 are mounted in the base 10 and insulated therefrom. The motor 27 is supplied with electrical energy through conductors 44 and 45 connected to the contact members 42 and 43. These contact members 42 and 43 are bridged by a conductor mounted on the arm 38 and insulated therefrom. The bridging of the contact members 42 and 43 takes place when the arm 38 is rotated counterclockwise, throwing the brake into an inactive position. The circuit for supplying the motor 27 is broken when the arm 38 is rotated clockwise, throwing the brake into an active position.

The operation of the drink mixer is as follows:

When the prime mover is set in operation it drives the worm gear 23 through the pulley 28, belt 30, pulley 31 and worm 25. The motion of the worm gear 23 is conveyed to the bell crank 13 through the rigid link 33, giving the bell crank an oscillatory movement about the axle 12. This angular movement of the bell crank gives any drink container mounted in the drink container receiver a drink-mixing motion which serves to agitate the ingredients enclosed in the container. When it is desired to stop the operation of the drink mixer the operating arm 38 is rotated, throwing the arm 39 into the path of the extension of the crank pin 34 and at the same time breaking the circuit supplying the motor 27. The arm 39 is forced downward, raising the arm 37 and brake block 36. This operation of the arms 39 and 37 takes place when the arm of the bell crank carrying the drink container receiver has reached approximately a horizontal position. When the brake block 36 is thrown into engagement with the drum 29 by the operation of the arms 39 and 37 the prime mover is stopped, stopping the bell crank in the desired position. Upon the swinging of the arm in the opposite direction to release the drum 29 the spring 41 drives the brake block downward away from the drum 29.

The spring 14 assists in the operation of the bell crank. When the bell crank is moved downward the spring is energized and tends to raise the bell crank. Consequently as soon as the bell crank starts on its upward movement the spring 14 assists the prime mover in operating the bell crank. The energizing of the spring by the bell crank as it moves downward gradually absorbs the momentum of the bell crank and eliminates the possibility of shocks to the drink mixer when the bell crank reaches the limit of its downward motion.

I would state in conclusion that while the illustrated example constitutes a practical embodiment of my invention I do not limit myself strictly to the exact details herein illustrated since manifestly the same can be considerably varied without departing from the spirit of the invention as defined in the appended claims.

Claims:

1. In a drink mixer including a prime mover, an oscillating arm, means for operating said oscillating arm, means for stopping the oscillating arm in any desired position, comprising means for stoppng the prime mover and means controlled by the operating mechanism for operating the prime mover stopping means when the arm has reached the desired position.

2. In a drink mixer including a frame, an oscillatory arm, a prime mover, an operating mechanism driven by the prime mover for giving the arm an oscillatory movement, means for stopping the oscillatory arm in a predetermined position comprising means for stopping the prime mover, means actuated by the operating mechanism for the oscillatory arm for operating the prime mover stopping means, and means for moving said actuating means into and out of engagement with the arm operating mechanism.

3. In a drink mixer including an oscillatory arm, an operating mechanism for working the oscillatory arm, and a prime mover co-operating with the operating mechanism, means for stopping the oscillatory arm in a predetermined position comprising a post mounted to rotate about a vertical axis, a pivotally mounted arm carried by the post, a brake carried by said pivotally mounted arm, and means for rotating the post about its vertical axis to move the pivotally mounted arm during association with the operating mechanism, said operating mechanism serving to swing the pivotally mounted arm about its pivot point, projecting the brake into engagement with the prime mover to stop the operation of the latter.

4. A drink mixer comprising a frame, an oscillatory arm pivotally mounted on the frame, an operating mechanism for working said oscillatory arm, a prime mover for driving said operating mechanism, a brake for controlling the operation of the prime mover to stop the oscillatory arm in a predetermined position, means adapted to be projected into association with the operating mechanism for operating the brake, means for operating said brake operating mechanism, and means provided in conjunction with the means for operating the brake operating mechanism to control the supply of power to the prime mover.

SHAKIR S. JERWAN.